United States Patent
Hodge (10) Patent No.: US 12,426,712 B2
(45) Date of Patent: Sep. 30, 2025

(54) EASEL ASSEMBLY FOR PORTABLE EASEL

(71) Applicant: East Carolina University, Greenville, NC (US)

(72) Inventor: Elizabeth Marie Hodge, Beaufort, NC (US)

(73) Assignee: East Carolina University, Greenville, NC (US)

( * ) Notice: Subject to any disclaimer, the term of this patent is extended or adjusted under 35 U.S.C. 154(b) by 0 days.

(21) Appl. No.: 18/176,512

(22) Filed: Mar. 1, 2023

(65) Prior Publication Data

US 2024/0292951 A1  Sep. 5, 2024

(51) Int. Cl.
*A47B 97/04* (2006.01)
*F16M 11/20* (2006.01)

(52) U.S. Cl.
CPC ......... *A47B 97/04* (2013.01); *F16M 11/2042* (2013.01)

(58) Field of Classification Search
CPC ........ F16M 11/06; F16M 11/10; F16M 11/12; F16M 11/121; F16M 2200/04; A47B 19/08; A47B 23/001; A47B 2023/004; A47B 2023/005; A47B 2023/043; A47B 2024/044; A47B 2023/046; A47B 97/04
USPC .... 248/149, 150, 154, 158, 160, 162.1, 159, 248/157, 419, 460, 461, 462, 463, 464, 248/465
See application file for complete search history.

(56) References Cited

U.S. PATENT DOCUMENTS 2,815,517 A * 12/1957 Andresen, Jr. ............ B63B 3/00
                                                        440/105
3,226,077 A    12/1965 Killen
(Continued)

FOREIGN PATENT DOCUMENTS

CA         2622065 A1    8/2009

OTHER PUBLICATIONS

"Plein Air from the Kayak" Youtube, uploaded by habowskistudio, Jul. 12, 2018, https://www.youtube.com/watch?v=Eld-PBpk8ak.
(Continued)

*Primary Examiner* — Alfred J Wujciak
(74) *Attorney, Agent, or Firm* — Stanek Lemon Crouse & Meeks, PA (57) ABSTRACT

Disclosed herein is an easel assembly that can provide portability and versatility. The easel assembly can include a recessed docking interface that can allow for a stable and secure engagement with a docking arm or support arm while also enabling the easel assembly to maintain stability when undocked. The easel assembly can allow for easy setup and breakdown, making it easy to transport and use in a variety of indoor and outdoor settings. The docking interface can enable attachment to a wide range of vehicles, maintaining a stable interface when attached and providing the convenience of displaying and using various materials while on the go. The easel assembly can include manipulatable features on the support arm, allowing for adjustments to the angle or orientation of the top surface of the easel assembly, making it easy to set up or adjust the easel assembly to a desired angle and orientation. The disclosed easel assembly can provide a versatile and easy-to-use platform for displaying and using various materials in a range of settings and environments.

20 Claims, 5 Drawing Sheets

(56) References Cited

U.S. PATENT DOCUMENTS

| | | | | |
|---|---|---|---|---|
| 6,138,970 | A | * | 10/2000 | Sohrt ..................... F16M 11/10 |
| | | | | 248/278.1 |
| 7,717,393 | B2 | | 5/2010 | Edgmon et al. |
| 7,959,120 | B2 | * | 6/2011 | Liao ................... B60R 11/0252 |
| | | | | 248/292.12 |
| 8,419,309 | B2 | | 4/2013 | Wimberley |
| 2007/0034753 | A1 | * | 2/2007 | Lee .................... B60R 11/0241 |
| | | | | 248/121 |
| 2007/0164176 | A1 | * | 7/2007 | Liao ...................... F16M 13/02 |
| | | | | 248/176.3 |
| 2023/0045295 | A1 | * | 2/2023 | Cagliostro ............. H04M 1/04 |
| 2024/0208625 | A1 | * | 6/2024 | Railey .................... B63B 34/20 |

OTHER PUBLICATIONS

Watercolour Kayaker, Instagram Page, @onthewater.colour, https://www.instagram.com/onthewater.colour/?igshid=YmMyMTA2M2Y%3D.

* cited by examiner

EASEL ASSEMBLY FOR PORTABLE EASEL

FIELD

The present disclosure generally relates to a portable easel assembly.

BACKGROUND

Easels are commonly used to support various portable materials while they are being worked on or viewed. Typically, an easel includes a frame or stand with a flat surface, called a canvas, on which the material is placed. The canvas may be adjustable in terms of angle or height, allowing for the artist or presenter to find a comfortable or suitable position for their work.

SUMMARY

The following disclosure describes non-limiting examples of some embodiments. For instance, other embodiments of the disclosed systems and methods may or may not include the features described herein. Moreover, disclosed advantages and benefits can apply only to certain cases of the invention and should not be used to limit the disclosure. The embodiments disclosed herein each have several aspects, no single one of which is solely responsible for the disclosure's desirable attributes.

Disclosed herein is an easel assembly that can provide portability and versatility. The easel assembly can include a recessed docking interface that can allow for a stable and secure engagement with a docking arm or support arm while also enabling the easel assembly to maintain stability when undocked. The easel assembly can allow for easy setup and breakdown, making it easy to transport and use in a variety of indoor and outdoor settings. The docking interface can enable attachment to a wide range of vehicles, maintaining a stable interface when attached and providing the convenience of displaying and using various materials while on the go. The easel assembly can include manipulatable features on the support arm, allowing for adjustments to the angle or orientation of the top surface of the easel assembly, making it easy to set up or adjust the easel assembly to a desired angle and orientation. The disclosed easel assembly can provide a versatile and easy-to-use platform for displaying and using various materials in a range of settings and environments.

Disclosed herein is an easel assembly which can include a base supporting a top surface of the base, a first holder, a second holder, and a docking interface. The first holder can be engageable with a top portion of the top surface of the base and engageable with a bottom portion of the top surface of the base in lieu of the top portion, and extends substantially parallel with a longitudinal axis of the top surface of the base. The second holder can be engageable with a first side portion of the top surface of the base and engageable with a second side portion of the top surface of the base in lieu of the first side portion, and extends substantially perpendicular to the first holder. The docking interface can be configured to detachably interconnect the easel assembly with a support arm for supporting the easel assembly in a raised upright position, and can be at least partially inset in a bottom region of the base such that the easel assembly lays substantially flat on a second substantially planar surface when detached from the support arm.

In some embodiments, the docking interface can be inset into a cavity defined by the bottom region of the base. The docking interface may define a receiving recess for slidably receiving and removably retaining a complementary protrusion of the support arm to thereby removably secure the easel assembly to the support arm. The base may define first and second receiving regions for slidably receiving and removably retaining first and second utility compartments, respectively, and the docking interface can be positioned between the first and second receiving regions. The support arm can be manipulatable to allow for adjustment of a plane of the top surface of the base.

The easel assembly can be used to hold a portable member such as a piece of paper, a canvas, a sketchbook, book, an e-reader, or a portable electronic device. The support arm can also include a mounting interface for mounting to a variety of vehicles including personal watercraft, self-propelled vessel, mechanically propelled vessel, all-terrain vehicle, utility vehicle, automobile, snow mobile, motorcycle, or bicycle. In some embodiments, the support arm can include a cockpit engagement interface for mounting to a personal watercraft, such as a kayak, and can be configured to mount to a cockpit of the personal watercraft. The support arm may include a self-balancing system configured to automatically adjust an angle of a plane of the top surface of the base responsive to movement of the personal watercraft caused by water interaction.

The easel assembly may include a Wimberley clamp and a non-tripod support arm or a single support arm. It can also be adapted to receive and secure a paint tray accessory. The easel assembly may include a pivot mechanism disposed between the base and the support arm, configured to allow the support arm to be adjusted to different angles, and a plurality of adjustment mechanisms disposed on the base, configured to adjust the height of the support arm. In some cases, the easel assembly can include a disengagement button positioned on the docking interface for easy release of a connection between the support arm and the easel assembly, as well as at least one repositionable positioning element on the top surface for securely holding a material in place. The repositionable positioning element can be positioned about perpendicular to the longitudinal axis and/or about parallel to a lateral axis of the top surface.

BRIEF DESCRIPTION OF THE DRAWINGS

Throughout the drawings, reference numbers can be re-used to indicate correspondence between referenced elements. The drawings are provided to illustrate embodiments of the present disclosure and do not to limit the scope thereof.

DETAILED DESCRIPTION

Although certain embodiments and examples are described below, it will be understood that the disclosure extends beyond the specifically disclosed embodiments and/or uses and obvious modifications and equivalents thereof. Thus, it is intended that the scope of the disclosure herein disclosed should not be limited by any particular embodiments described below.

Disclosed herein is an easel assembly that provides portability and versatility. The easel assembly can include a recessed docking interface that allows for a stable and secure engagement with a docking arm, or support arm, while also enabling the easel assembly to maintain stability when undocked. The easel assembly allows for easy setup and breakdown, making it easy to transport and use in a variety of indoor and outdoor settings. The easel assembly can include a disengagement button for easily releasing the connection between the support arm and the easel assembly, adding to its convenient and easy-to-use design. The easel assembly can allow for a range of angle and height adjustments, providing users with flexibility and comfort while using it. In some cases, the support arm can be manipulatable, bendable, or extendable, allowing for adjustments to the angle or orientation of the top surface of the easel assembly, making it easy to set up or adjust the easel assembly to a desired angle and orientation. In some cases, the easel assembly described herein has versatility. For example, depending on the size and shape of an object placed on the easel assembly, as well as the angle at which the easel is positioned to accommodate the object, the easel assembly can function as a table or desk-like structure. This can provide a convenient and multi-functional workspace for artists, designers, or anyone who needs a stable surface to work on.

The docking interface can advantageously enable attachment to a wide range of vehicles, including cars, trucks, buses, trains, boats, and personal watercraft such as canoes or kayaks, maintaining a stable interface when attached and providing the convenience of displaying and using various materials while on the go. For example, the easel assembly can be implemented with a self-balancing system, making it easy to set up and adjust to a desired angle or orientation. In some cases, the easel assembly includes a vehicle-specific engagement interface for engaging with a particular vehicle. For example, the easel assembly can include a cockpit engagement interface, which can allow for secure and stable attachment of the easel assembly to a kayak or other personal watercraft, while still allowing for easy adjustments and movements. These features make the easel assembly a valuable tool for both recreational and professional use, providing users with a versatile and easy-to-use platform for displaying and using various materials in a range of settings and environments.

In some cases, the easel assembly is attachable to the interior of vehicles, such as cars or trucks, providing a convenient workspace on-the-go. Depending on the size of the vehicle and the desired placement of the easel assembly, it can be secured in various locations such as cup holders, door spaces, armrests, or other suitable spaces within the vehicle. By offering a portable and removable easel assembly, users can enjoy a workspace on-the-go without the need for built-in workspaces or tables. This added convenience and portability make the disclosed easel assembly a valuable tool for professionals and recreational users alike, allowing them to work or create while traveling or commuting.

Easel Assembly

Figure 1A:
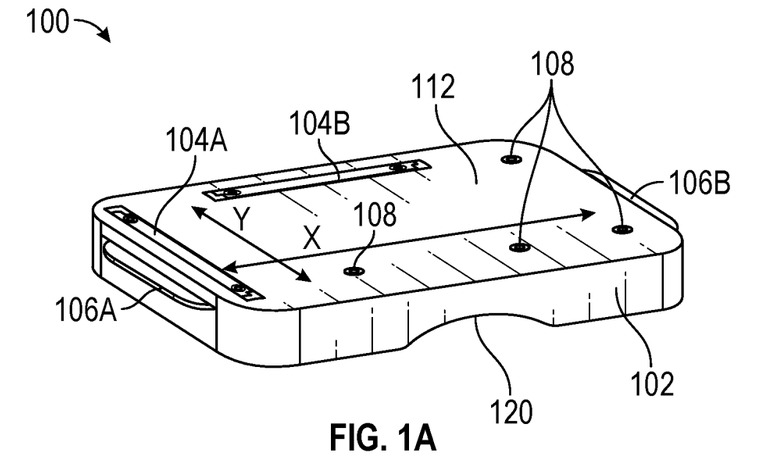
FIG. 1A is a top perspective view of an easel assembly in accordance with the present disclosure.

FIG. 1A is a top perspective view of an easel assembly 100 in accordance with the present disclosure. The easel assembly 100 includes various elements that work together to provide a stable and versatile surface 112 for writing, drawing, reading, or the like. For example, the easel assembly 100 includes a base 102, a positioning element 104A, 104B (individually or collectively referred to as positioning element 104 or positioning element 104), a drawer 106A, 106B (individually or collectively referred to as drawer 106 or drawers 106), and mating interfaces 108. However, it will be appreciated that the easel assembly 100 can include fewer, different, or additional components, as desired.

The base 102 includes a top surface 112 for providing a stable and flat interface for writing, reading, drawing, or other similar activities. In some cases, the top surface 112 may not be strictly planar. For example, the top surface 112 may include slight curvatures or undulations. The shape of the base 102 may vary across embodiments. For example, the base 102 may be generally rectangular prism-shaped, cube-shaped, or other geometric shapes. The base 102 may include one or more drawers 106 or compartments, such as on its edges, for storage, such as for writing materials or other items.

A bottom portion of the base 102 can define a recessed region 120. As described in more detail herein, a docking interface (not shown) can be positioned within the recessed region 120. In this way, the easel assembly 100 lays flat and stable on a planar surface, such as a desk, when detached from a support arm (not shown). The shape of the recessed region 120 of the base 102 can vary across different embodiments. As shown, the recessed region 120 can be a concave section position proximate the center of the underside of the base 102. In addition or alternatively, the recessed region 120 may be squared off or take on other shapes that provide an opening in which the docking interface 122 can reside. Furthermore, the recessed region 120 may be positioned at other locations on the base 102, such as on an edge or side of the base 102, or off centered.

The top surface 112 can include one or more positioning elements 104 thereon. The positioning elements 104 can be configured to provide a secure and stable hold on materials, such as paper, canvas, sketchbook, book, e-reader, monitor, laptop, tablet, smart phone, PDA, or other portable electronic device, placed on the top surface 112. In some configurations, the positioning elements 104 are positioned parallel to a longitudinal axis, X, of the top surface 112, similar to the functionality of a clip on a clipboard. This configuration allows the user to use a positioning element 104 to securely hold the edges or corners of the material in place without obscuring the view of the work area. In other configurations, a positioning element 104 is positioned about perpendicular to the longitudinal axis, X, and/or about parallel to a lateral axis, Y, of the top surface 112.

The positioning elements 104 can be repositionable on various parts of the top surface 112, including the bottom, top, or side. For example, in some cases, the top surface 112 includes mating interfaces 108 (e.g., predefined holes or engagement members) for removably engaging with the positioning elements 104. By allowing the user to adjust the position of the positioning elements 104 about the top surface 112, the user can move the positioning of the positioning elements 104 to best suit their needs and preferences. For example, a right-handed user may position the positioning elements 104 at the top and left side of the top surface 112 to secure the corners of a piece of paper, while a left-handed user may move the positioning elements 104 to the top and right side of the top surface 112. The positioning elements 104 can also be implemented in various forms, such as a clip or other types of clamping mechanisms. Overall, the positioning elements 104 are designed to secure a portable member, such as paper, in place for the user to work on, and can also be used to secure other types of mediums.

Figure 1B:
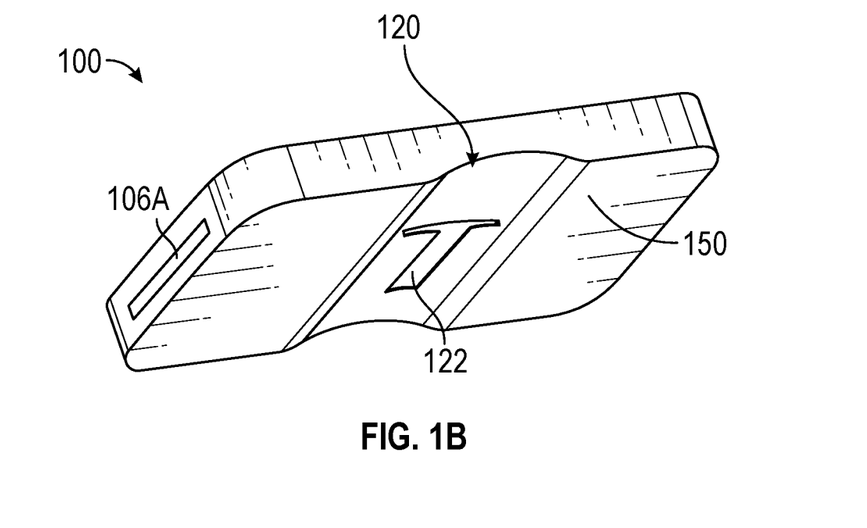
FIG. 1B is a bottom perspective view of the easel assembly of FIG. 1A.

FIG. 1B is a bottom perspective view of the easel assembly 100 of FIG. 1A. As shown, a bottom region 150 of the base 102 includes a recessed region 120 that serves as a housing for a docking interface 122. The docking interface 122 can serve as a connection point between the easel assembly 100 and a support arm (not shown) and is positioned within the recessed region 120, thereby allowing the easel assembly 100 to lay flat and securely on a flat surface, such as a desk, when detached from the support arm.

In the illustrated example, the docking interface 122 is implemented as a female receptacle. In some such cases, the docking interface 122 may be configured to receive and retain a complementary protrusion of the support arm. However, it will be appreciated that, in some cases, the docking interface 122 may be implemented as a male member, or as a combination of male and female members, or may include another type of connection mechanism. For example, if it is a female receptacle, it may be configured to receive and retain a complementary protrusion of the support arm, while if it is a male member, it may fit into a complementary female portion of the support arm. The docking interface 122 can also include a disengagement button (not shown) for easy release of the connection between the support arm and the easel assembly 100.

The docking interface 122 can be positioned within a recessed region 120 on the bottom region 150 of the base 102, which can allow for easy access to the docking interface 122 to mate the support arm into the docking interface 122. The shape of the recessed region 120 of the base 102 can vary across different embodiments. For example, the recessed region 120 can be concave, squared off, or take on other shapes that provide an opening in which the docking interface 122 can reside. For example, recessed region 120 could be a round, rectangle, or a square shape, rather than a curved concave shape. Additionally, the dimensions of the recessed region 120 can also vary, such as being 2×4 inches, 4×8 inches, or 6×12 inches in size. It will be appreciated that the recessed region 120 can vary across embodiments, for example depending on the size and shape of the base 102. For example, in some cases, the recessed region 120 can extend about 2, 4, 6, or 8 inches wide, about 8, 12, 16, or 20 inches long, or about 1, 2, 3, 4, or 5 inches deep.

Figure 2A:
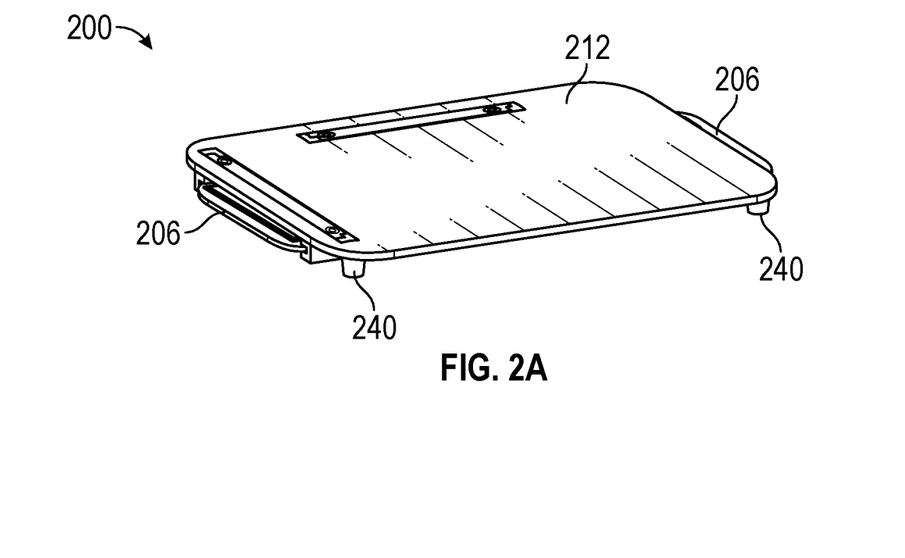
FIG. 2A is a top perspective view of an easel assembly in accordance with the present disclosure.

FIG. 2A is a top perspective view of an easel assembly 200 in accordance with the present disclosure. The easel assembly 200 shown in FIG. 2A can be an embodiment of the easel assembly 100 of FIG. 1A. In this example, the easel assembly 200 includes a more open bottom region 250, as compared to the easel assembly 100. For instance, instead of a defined recessed section, the easel assembly 200 includes a plurality of legs 240 positioned proximate each corner of the bottom region 250 of the assembly 200. The legs 240 raise the assembly 200 up so that it can lay stable on a desk when undocked. Further, the legs 240 also make it so that the docking interface 222 is effectively recessed into the bottom region 250 (i.e., not flush with a lowermost part of the bottom region 250).

In this embodiment, the legs 240 are four in number, each located at a corner of the easel assembly 200. Further, the legs 240 are cylindrical in shape, with a diameter ranging from about 0.3 inches to about 2 inches, and a height ranging from about 1 inch to about 3 inches. The legs can be made of a rigid material, such as plastic or metal, and can be attached to the bottom region 250 of the assembly 200 using screws or other suitable fasteners. It will be appreciated that the number, size, and position of the legs can be adjusted as desired, for example depending on the size and shape of the assembly. For example, in some cases, the easel assembly 200 can be equipped with three legs arranged in a triangular configuration, with one leg located at each corner of a triangle. As another option, the easel assembly 200 can include two legs positioned at opposite corners, which may be elongated to provide a more stable base. In some such cases, the legs can be longer, so as to provide a stable base.

Figure 2B:
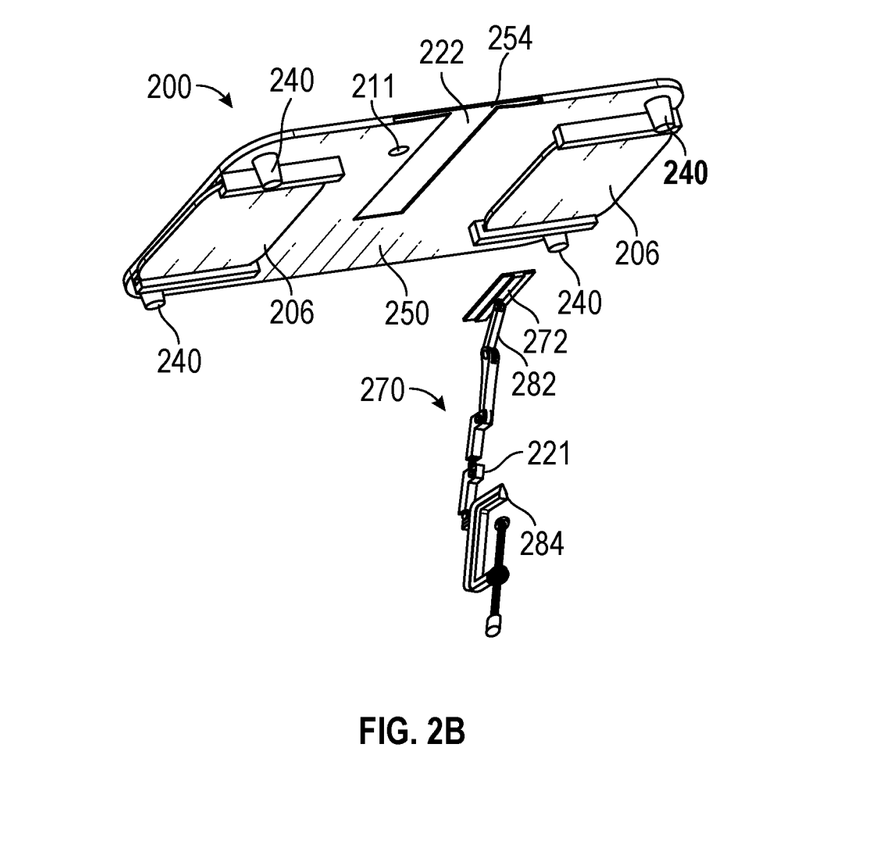
FIG. 2B is a bottom perspective view of the easel assembly of FIG. 2A and a support arm detached from a docking interface of the easel assembly.

FIG. 2B is a bottom perspective view of the easel assembly 200 of FIG. 2A and a support arm 270 detached from a docking interface 222 of the easel assembly. As described, the docking interface 222 is recessed into the bottom region 250 of the assembly 200, leaving space for the legs 240 to provide stability when the assembly is undocked. In this example, the docking interface 222 is implemented as a female receptacle configured to slidably receive and removably retain a complementary protrusion 272 of the support arm 270. The easel assembly 200 includes two drawers 206 for storage, such as for writing materials or other items. The docking interface 222 include a disengagement button 211 for easy release of the connection between the support arm 270 and the easel assembly 200. This design allows for easy attachment and detachment of the support arm 270 to the easel assembly 200.

The support arm 270 is couplable to the easel assembly 200 via the docking interface 222. The docking interface 222 allows for the adjustment of the easel assembly 200 relative to the support arm 270, which allows for the adjustment of the angle or orientation of the top surface 212 of the easel assembly 200. The support arm 270 is manipulatable, bendable, or extendable, which allows for adjustments to the angle or orientation of the top surface 212 of the easel assembly 200, making it easy to set up or adjust the easel assembly 200 to a desired angle and orientation. For example, the support arm 270 may include one or more hinge mechanisms 221 that allow the user to bend at least a portion of the support arm 270 to a desired angle. In addition or alternatively, the support arm 270 may include a telescoping mechanism (not shown) that allows the user to extend or retract the support arm 270 to a desired length. In some cases, the support arm 270 and/or the easel assembly 200 is self-balancing. The manipulatable features of the support arm 270 can make the easel assembly 200 easy to set up and adjust to a desired angle or orientation.

The support arm 270 can include a first end 282 and a second end 284. The first end 282 can be configured to couple to the docking interface 222 of the easel assembly 200. For example, as shown, the first end 282 may include a plate-like member that can be slidably received by the docking interface 222, through slot 254. The second end 284 can be configured to couple to various objects or means of transportation, such as personal watercrafts, all-terrain vehicles, automobiles, motorcycles, or bicycles. In this illustrated example, the second end 284 includes a clamp. In some cases, the second end 284 can include a docking interface similar to the docking interface 222. For example, the docking interface of the second end 284 can include a Wimberley clamp, a cockpit engagement interface, or other similar means.

Figure 3:
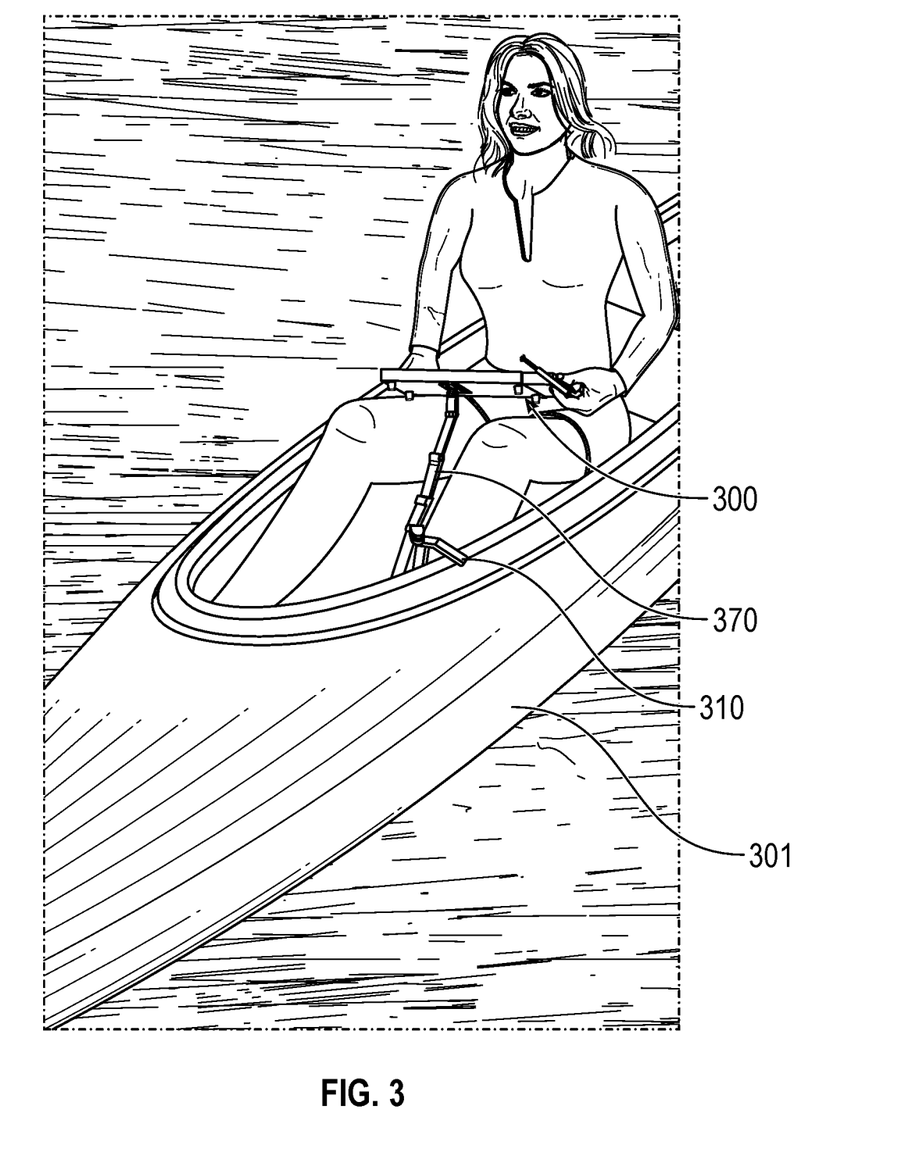
FIG. 3 is an environmental view of an example easel assembly coupled to a kayak via a support arm.

FIG. 3 shows an environmental view of an example easel assembly 300 coupled to a kayak through a support arm 370. The easel assembly 300, which can be an embodiment of the easel assembly 100 or 200, is attached to the support arm 370 at one end, while the other end of the support arm 370 is attached to the kayak 301 via the engagement member 310. The easel assembly 300 is shown in a tilted position, with the support arm 370 providing stability and keeping the easel assembly 300 in place while painting. This configuration allows the user to paint while on the water, providing a unique and enjoyable painting experience. The support arm 370 can be adjustable in length, allowing the user to position the easel assembly at a comfortable distance. The easel assembly 300 can also be easily detached from the support arm 370 for transport or storage. The kayak 301 can be any type of watercraft that can support the weight of the easel assembly 300 and the user, such as a canoe, kayak, or paddle board.

Figure 4:
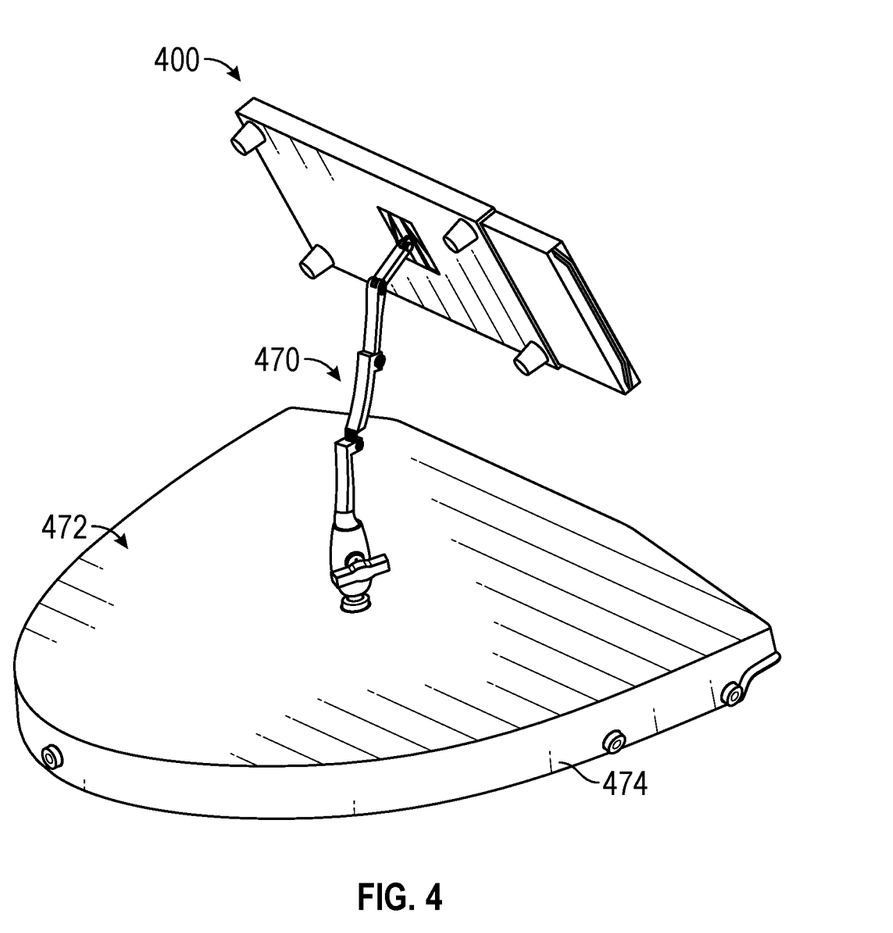
FIG. 4 is an example easel assembly coupled to an example cockpit engagement interface.

FIG. 4 is an example easel assembly 400 attached to a support arm 470, which is in turn connected to a cockpit engagement interface 472. The cockpit engagement interface 472 provides a safe and stable way to attach the easel assembly 400, through the support arm 470, to a kayak or other personal watercraft (not shown). The cockpit engagement interface 472 includes one or more attachment points for joining the support arm 470. The cockpit engagement interface 472 includes an exterior edge 474 configured to fit snugly within the kayak's cockpit, providing ample space for one or more individuals to sit. Additionally, it may come equipped with locking mechanisms or other features that guarantee secure attachment of the easel assembly to the kayak during use.

Figure 5:
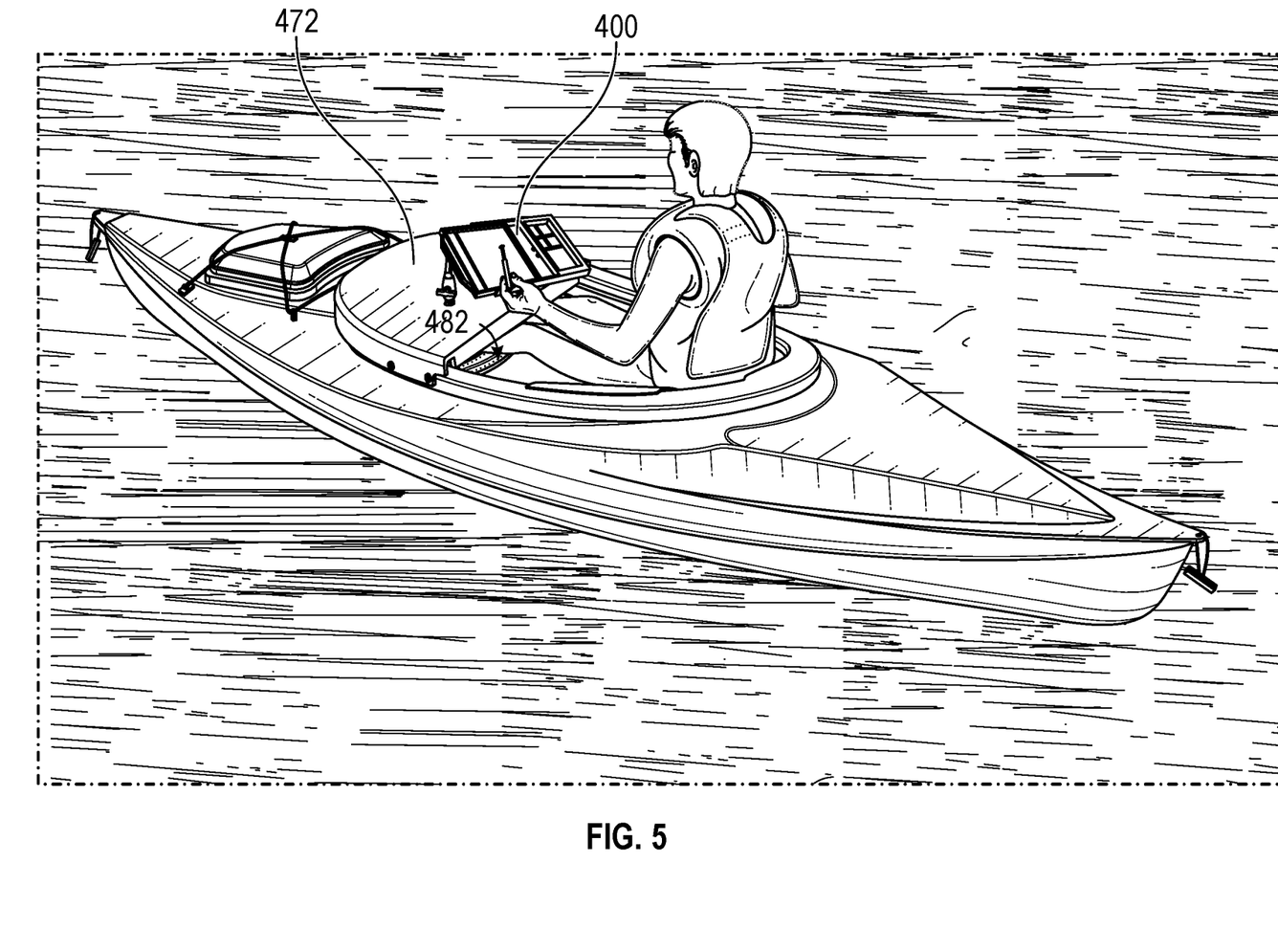
FIG. 5 is an environmental view of the example easel assembly of FIG. 4 coupled to a kayak via the cockpit engagement interface.

FIG. 5 is an environmental view of the example easel assembly 400 of FIG. 4 coupled to a kayak via the cockpit engagement interface 472. This allows the user to easily sketch or paint while enjoying the scenery of the water. As shown, the cockpit engagement interface 472 connects the easel assembly 400 (via the support arm 470) to the cockpit 482 of a kayak or other personal watercraft. In some cases, the cockpit engagement interface 472 is shaped to complement the shape of the cockpit 482 and sits within the opening of the cockpit 482. This allows for a secure and stable connection between the easel assembly 400 and the kayak, enabling users to use the easel while on the watercraft. Personal watercrafts, such as kayaks, can provide a unique set of challenges for use of an easel. In some cases, the easel assembly 400 has a weight and size that does not impede the use of the personal watercraft or does not interfere with paddling.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "include," "can include," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the routines described elsewhere herein can be performed in a different sequence, can be added, merged, or left out altogether (non-limiting example: not all are necessary for the practice of the algorithms). Moreover, in certain embodiments, operations, acts, functions, or events can be performed concurrently, rather than sequentially.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

Disjunctive language such as the phrase "at least one of X, Y, or Z," unless specifically stated otherwise, is otherwise understood with the context as used in general to present that an item, term, etc., may be either X, Y, or Z, or any combination thereof (non-limiting examples: X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described elsewhere herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any terms generally associated with circles, such as "radius" or "radial" or "diameter" or "circumference" or "circumferential" or any derivatives or similar types of terms are intended to be used to designate any corresponding structure in any type of geometry, not just circular structures. For example, "radial" as applied to another geometric structure should be understood to refer to a direction or distance between a location corresponding to a general geometric center of such structure to a perimeter of such structure; "diameter" as applied to another geometric structure should be understood to refer to a cross sectional width of such structure; and "circumference" as applied to another geometric structure should be understood to refer to a perimeter region. Nothing in this specification or drawings should be interpreted to limit these terms to only circles or circular structures.

What is claimed is:

1. An easel assembly comprising:
   a base supporting a top surface of the base;
   a first positioning element engageable with a top portion of the top surface of the base and engageable with a bottom portion of the top surface of the base in lieu of the top portion, wherein while engaged with the top surface of the base the first positioning element extends substantially parallel with a longitudinal axis of the top surface of the base,
   a second positioning element engageable with a first side portion of the top surface of the base and engageable with a second side portion of the top surface of the base in lieu of the first side portion, wherein while engaged with the top surface of the base the second positioning element extends substantially perpendicular to the first positioning element; and
   a docking interface configured to detachably interconnect the easel assembly with a support arm for supporting the easel assembly in a raised upright position, wherein the easel assembly is configured to lays substantially flat on a second substantially planar surface when detached from the support arm, wherein the support arm comprises a cockpit engagement interface, wherein the cockpit engagement interface is configured to mount a rim of a cockpit of a personal watercraft, wherein the rim defines an upper boundary of the cockpit, wherein the cockpit comprises an opening in the personal watercraft for one or more individuals to sit therein,
   wherein the easel assembly comprises a stabilization system configured to maintain an orientation of the top surface of the base relative to external forces, including movement of the personal watercraft.

2. The easel assembly of claim 1, wherein the support arm is manipulatable to allow for adjustment of a plane of the top surface of the base.

3. The easel assembly of claim 1, wherein the first positioning element comprises a first holder configured to bias a first edge of a portable member and the second positioning element is configured to bias a second edge of the portable member.

4. The easel assembly of claim 3, wherein the portable member comprises at least one of a piece of paper, a canvas, a sketchbook, book, an e-reader, or a portable electronic device.

5. The easel assembly of claim 1, wherein the personal watercraft is a kayak.

6. The easel assembly of claim 1, wherein the movement is a result of water interacting with the personal watercraft.

7. The easel assembly of claim 1, wherein the support arm is a non-tripod support arm.

8. The easel assembly of claim 1, wherein the easel assembly is adapted to receive and secure a paint tray accessory.

9. The easel assembly of claim 1, further comprising a pivot mechanism disposed between the base and the support arm, the pivot mechanism being configured to allow the support arm to be adjusted to different angles.

10. The easel assembly of claim 1, wherein the docking interface is a recessed female receptacle configured to slidably receive and removably retain a complementary protrusion of the support arm, wherein the docking interface is positioned within a recessed region on the bottom portion of the base.

11. The easel assembly of claim 1, wherein the support arm comprises a disengagement button positioned on the docking interface for release of a connection between the support arm and the easel assembly.

12. The easel assembly of claim 1, wherein the at least one positioning element comprises a rigid clamping member, the rigid clamping member being configured to securely engage a portion of a portable member against the top surface of the base.

13. An easel assembly comprising:
   a base supporting a top surface of the base;
   a first positioning element engageable with a top portion of the top surface of the base and engageable with a bottom portion of the top surface of the base in lieu of the top portion, wherein while engaged with the top surface of the base the first positioning element extends substantially parallel with a longitudinal axis of the top surface of the base,
   a second positioning element engageable with a first side portion of the top surface of the base and engageable with a second side portion of the top surface of the base in lieu of the first side portion, wherein while engaged with the top surface of the base the second positioning element extends substantially perpendicular to the first positioning element; and
   a docking interface configured to detachably interconnect the easel assembly with a support arm for supporting the easel assembly in a raised upright position, wherein the easel assembly is configured to lays substantially flat on a second substantially planar surface when detached from the support arm, wherein the support arm comprises a cockpit engagement interface for mounting in a cockpit of a personal watercraft, wherein the cockpit comprises an opening in the personal watercraft for one or more individuals to sit therein,
   wherein the easel assembly comprises a stabilization system configured to maintain an orientation of the top surface of the base relative to external forces, including movement of the personal watercraft, wherein the stabilization system comprises a self-balancing system configured to automatically adjust an angle of a plane of the top surface of the base responsive to the movement of the personal watercraft.

14. The easel assembly of claim 13, wherein the cockpit engagement interface is configured to mount to a rim of the cockpit of the personal watercraft, wherein the rim defines an upper boundary of the cockpit.

15. The easel assembly of claim 13, wherein the first positioning element comprises a first holder configured to bias a first edge of a portable member, and the second positioning element is configured to bias a second edge of the portable member.

16. The easel assembly of claim 15, wherein the portable member comprises at least one of a piece of paper, a canvas, a sketchbook, book, an e-reader, or a portable electronic device.

17. The easel assembly of claim 13, further comprising a pivot mechanism disposed between the base and the support arm, the pivot mechanism being configured to allow the support arm to be adjusted to different angles.

18. The easel assembly of claim 13, wherein the docking interface is a recessed female receptacle configured to slidably receive and removably retain a complementary protrusion of the support arm, wherein the docking interface is positioned within a recessed region on the bottom portion of the base.

19. The easel assembly of claim 13, wherein the support arm comprises a disengagement button positioned on the docking interface for release of a connection between the support arm and the easel assembly.

20. The easel assembly of claim 13, wherein the at least one positioning element comprises a rigid clamping member, the rigid clamping member being configured to securely engage a portion of a portable member against the top surface of the base.

* * * * *

UNITED STATES PATENT AND TRADEMARK OFFICE
CERTIFICATE OF CORRECTION

| | | |
|---|---|---|
| PATENT NO. | : 12,426,712 B2 | Page 1 of 1 |
| APPLICATION NO. | : 18/176512 | |
| DATED | : September 30, 2025 | |
| INVENTOR(S) | : Elizabeth Marie Hodge | |

It is certified that error appears in the above-identified patent and that said Letters Patent is hereby corrected as shown below:

In the Claims

Claim 1 Column 9, Line 49:
... is configured to lays substantially...
Should read:
-- ... is configured to lay substantially... --

Signed and Sealed this
Eleventh Day of November, 2025

John A. Squires
*Director of the United States Patent and Trademark Office*